United States Patent [19]

Krogsrud

[11] 4,133,657
[45] Jan. 9, 1979

[54] APPARATUS FOR PURIFICATION OF GASSES

[75] Inventor: Harald Krogsrud, Gjettum, Norway

[73] Assignee: Elkem-Spigerverket A/S, Oslo, Norway

[21] Appl. No.: 777,579

[22] Filed: Mar. 15, 1977

[30] Foreign Application Priority Data

Mar. 17, 1976 [NO] Norway .................................. 760930

[51] Int. Cl.² ............................................. B01D 46/04
[52] U.S. Cl. ...................................... 55/290; 55/302;
55/355; 55/502; 55/503; 55/508; 55/523;
55/498
[58] Field of Search .................... 55/96, 288, 290, 291,
55/295, 300, 302, 304, 355, 498, 502, 503, 508,
523, DIG. 16, 497

[56] References Cited

U.S. PATENT DOCUMENTS

| 1,043,551 | 11/1912 | Thurman | 55/290 |
|---|---|---|---|
| 1,356,086 | 10/1920 | Plaisted | 55/291 |
| 2,210,397 | 8/1940 | Dreiss | 55/498 |
| 2,845,140 | 7/1958 | Lühr | 55/291 |
| 2,892,510 | 6/1959 | Wygant | 55/523 |
| 3,113,923 | 12/1963 | Bingham | 55/295 |
| 3,246,961 | 4/1966 | Karlsson | 55/302 |
| 3,404,514 | 10/1968 | Fergason | 55/295 |
| 3,436,898 | 4/1969 | Kaess et al. | 55/523 |
| 3,441,382 | 4/1969 | Keith et al. | 55/523 |
| 3,716,968 | 2/1973 | Mischke | 55/294 |
| 3,800,510 | 4/1974 | Lamond | 55/502 |

FOREIGN PATENT DOCUMENTS

| 700244 | 11/1940 | Fed. Rep. of Germany | 55/503 |
|---|---|---|---|
| 2229105 | 1/1974 | Fed. Rep. of Germany | 55/300 |
| 348 of | 1874 | United Kingdom | 55/355 |
| 344227 | 3/1931 | United Kingdom | 55/96 |
| 389818 | 11/1973 | U.S.S.R. | 55/502 |

Primary Examiner—Frank W. Lutter
Assistant Examiner—David L. Lacey
Attorney, Agent, or Firm—Eyre, Mann, Lucas & Just

[57] ABSTRACT

A gas purification device comprising substantially concentric chambers separated by a filter tube is disclosed. The filter tube forms a common wall between adjacent chambers. Gas enters one of the chambers, passes through the filter, and exits from the other chamber. The gas is filtered by passage through the permeable wall. The filter tube may be rotated as a unit about a central shaft to move the walls of the cylinder past cleaning means such as scrapers, brushes, vibrators or pressurized gas blasts. The apparatus has special application to the purification of high temperature waste gasses from industrial furnaces.

11 Claims, 3 Drawing Figures

4,133,657

APPARATUS FOR PURIFICATION OF GASSES

BACKGROUND OF THE INVENTION

The removal of particulates from gasses has previously been done either by washing with liquids or by filtering with a permeable mechanical medium. Both of these methods require large equipment which is expensive both to install and to maintain.

The use of mechanical filtering is accompanied by additional problems when the gas to be purified is both dirty and hot such as in the case of the exhaust gas effluent of reduction furnaces e.g. carbide furnaces. The exhaust gas may have temperatures of from 800 to 1000° C and contains a great amount of dust. Most filter materials are destroyed at temperatures in this range. In addition, the large quantity of particulates in the exhaust gas requires frequent cleaning operations to be performed.

SUMMARY OF THE INVENTION

The present invention discloses an exhaust gas filter apparatus composed of a plurality of gas-permeable filter tubes which separate substantially annular concentric chambers. Alternate chambers are blocked off from the entry of exhaust gasses at one end of the filter apparatus and the remaining volumes are open to entry of the exhaust gasses. At the other end of the filter apparatus, the chambers which are closed at the first end are open and those which are open at the first end are closed. Thus, gasses which enter a chamber are unable to escape except by passage through the filter tube which serves as a common wall between adjacent chambers.

One type of filter material from which the filter tube may be formed is aluminum-silicon-oxide commonly called kaowool. Kaowool is light in weight, has sufficient strength and porosity to be an effective filter and can withstand high gas temperatures. Other filter materials of properties suitable for the particular application could be substituted without departing from the spirit and scope of the invention.

The filter tubes are coaxially mounted as a unit and are arranged for rotation about their common axis. In one embodiment, the unit is oscillated through an angle of 90 degrees. Stationary cleaning devices such as scrapers, brushes, vibrators or gas blasts are positioned within the chambers. As the walls of the filter tubes are moved past the cleaning devices, the particulates are dislodged from the filter material. In the embodiment which oscillates through an angle of 90 degrees, at least four sets of cleaning devices, 90 degrees apart, are required to clean the entire surface of the tubes. Cleaning may be performed on the inlet side of the tubes only, or it may be performed on both inlet and outlet sides. Different types of cleaning devices may be used simultaneously on inlet and outlet sides. For example, brushes or scrapers may be employed on the inlet side and an air blast may be used on the outlet side. The cleaning devices on the inlet and outlet sides may be located adjacent to each other on opposite sides of their respective filter tubes or they may be angularly spaced apart.

Continuous unidirectional rotation of the tubes through 360° is also contemplated as falling within the scope of the present invention.

Also disclosed is a filter housing which encloses the filter assembly and a sealed lid which prevents the escape of cleaned gas. The arrangement of the housing permits unobstructed removal of the lid and pendant filter assembly by lifting them from the housing for maintenance without additional disassembly operations being required.

DETAILED DESCRIPTION OF THE PREFERRED EMBODIMENT

Figure 1:
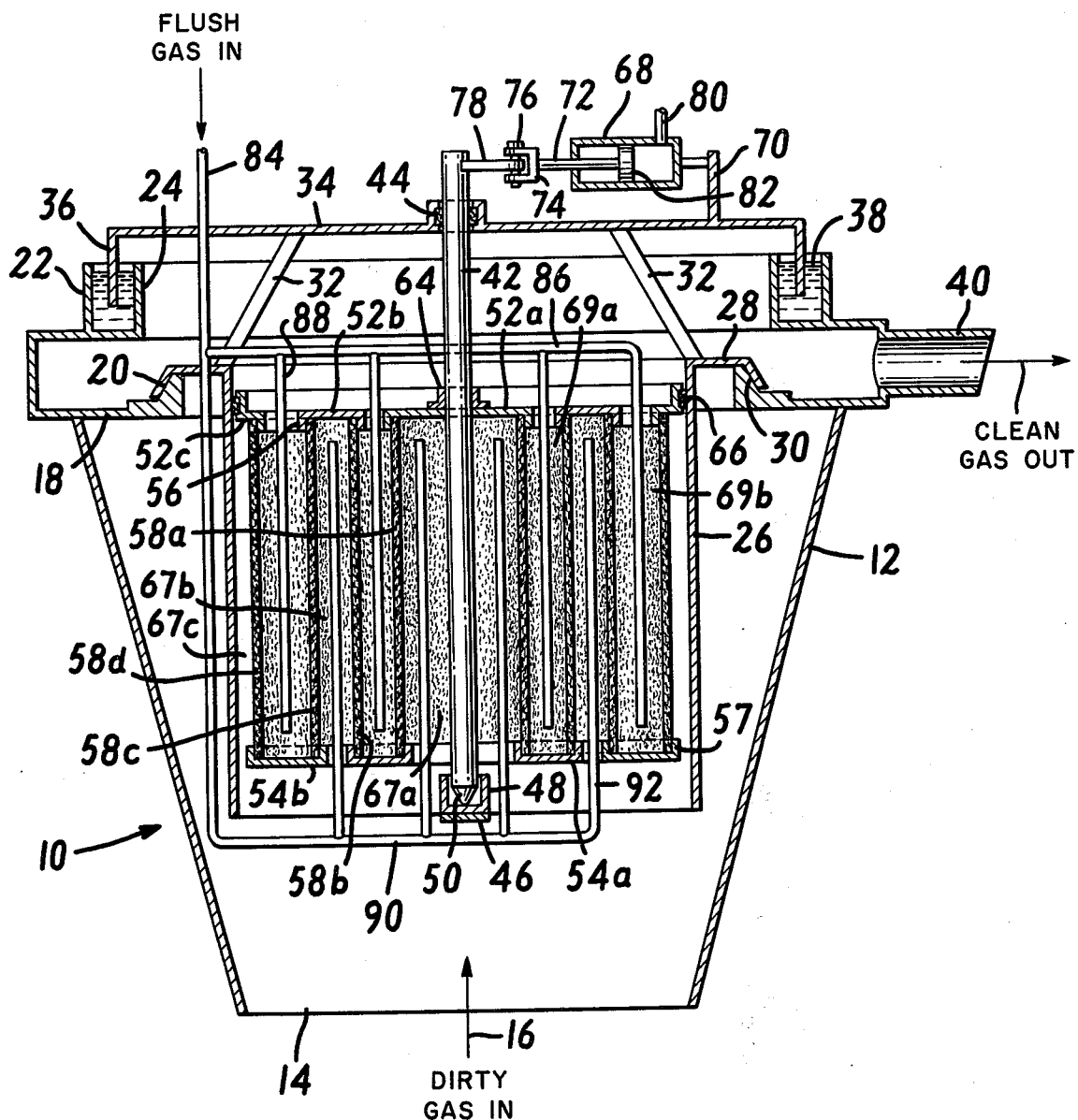
FIG. 1 shows an axial cross section of one embodiment of the present invention.

Referring to FIG. 1, there is shown an embodiment of the gas purification device shown generally at 10. A stationary housing 12 has an opening 14 through which gasses to be cleaned are admitted in the direction of the arrow 16. The housing 12 may have any convenient shape but preferably has the truncated conical shape shown. It should be made of a material, such as steel, which is capable of withstanding the temperature and chemical attack from the gasses and their contaminants. The top of the housing 12 terminates in an inward-directed flange 18 having a sealing surface 20.

A water-seal channel 22 is mounted to the housing 12 above the inward-directed flange 18. An opening 24 is provided radially inward of the water-seal channel 22.

A cylinder 26 of suitable material, such as steel, is centrally located coaxial with and within the housing 12. The cylinder 26 has an outward-directed flange 28 which has a sealing surface 30. The sealing surface 30 makes a gas-tight seal with the sealing surface 20. The outward-directed flange 28 is small enough to pass through the opening 24.

A plurality of support arms 32 are connected at their lower ends to the cylinder 26 and are connected at their upper ends to a lid 34. A downward-directed flange 36, located about the perimeter of the lid 34, fits sealingly into water 38 contained in the water-seal channel 22. The lid 34 thus seals the top of the housing 12 against escape of gas. A gas outlet 40 is provided for the exit of the cleaned gas.

A rotating shaft 42 passes through a seal 44 centrally located in the lid 34. The seal 44 allows rotation of the shaft 42 with respect to the lid 34 without permitting gas to escape. A cross-bar 46 is connected across the cylinder 26. A cup 48 in the center of the cross-bar 46 provides a support for the bottom end 50 of the rotating shaft 42. The bottom end 50 may be tapered as shown to reduce friction.

A plurality of upper end walls 52a, 52b and 52c each in the shape of an annular washer are spaced axially apart from a plurality of lower end walls 54a and 54b on the rotating shaft 42. The upper end walls 52a, 52b, 52c may have downward directed flanges 56 at their inner and outer perimeters and the lower end walls 54a, 54b may have upward directed flanges 57. Filter cylinders 58a, 58b, 58c and 58d are concentrically arranged between the upper end walls 52a, 52b and 52c and lower end walls 54a and 54b and form chambers open at the upper end or lower end according to the location of the end walls.

Figure 2:
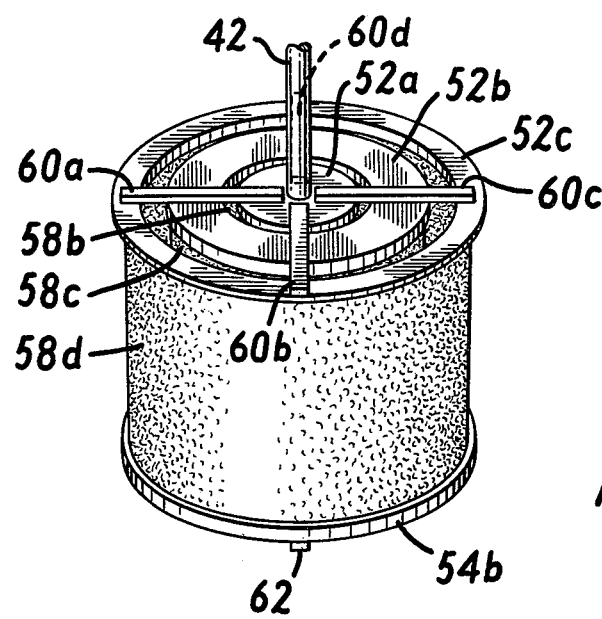
FIG. 2 shows a perspective view of the filter assembly.

Turning momentarily to FIG. 2, the upper end walls 52a, 52b, 52c are retained coplanar by attachment to upper braces 60a, 60b, 60c and 60d (hidden behind rotating shaft 42). The upper braces 60 may be in a cross shape as shown or may be in a different shape. There may also be more or less than four braces without departing from the scope of the invention. The lower end walls 54 are similarly retained coplanar by attachment to lower braces 62 (only the end of one brace is shown).

Returning now to FIG. 1, the upper end wall 52a is attached to the rotating shaft 42 by well known means such as collar 64. The lower braces (omitted from FIG. 1 for clarity) may also be connected to the rotating shaft by well known means. Thus the braces 60, 62, end walls 52, 54 and filter cylinders 58 all rotate as a unit with the rotating shaft 42. A peripheral seal 66 on the outer perimeter of outermost upper end wall 52c bears sealingly against the inside of the cylinder 26. The peripheral seal 66 allows rotation of the inner assembly with respect to the cylinder 26 without allowing the leakage of uncleaned gas past the junction.

Figure 3:
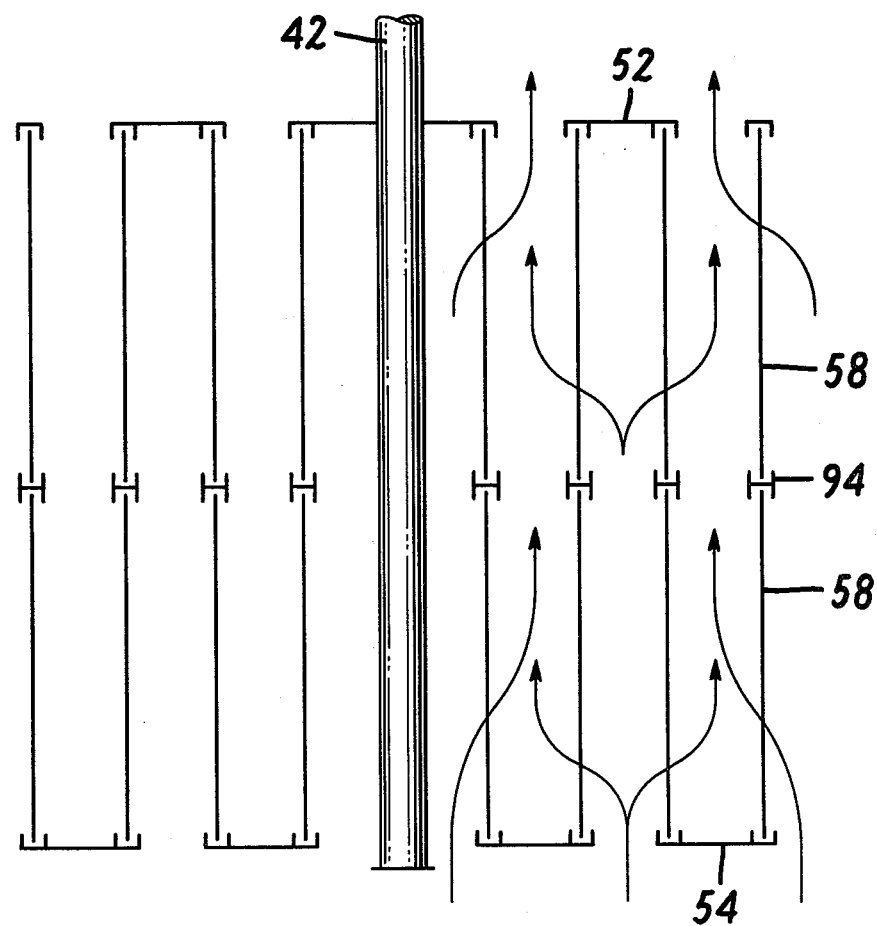
FIG. 3 shows an axial cross section of a filter having extended length.

As shown in FIG. 3, the length of the filter cylinder 58 can be increased indefinitely using intermediate rings 94 having an H cross section. The intermediate rings 94 may be wholly supported by the filter cylinders 58 or they may alternatively have cross braces (not shown) similar to the support of upper and lower end walls 52, 54. If cross braces are used, they may optionally be connected to the rotating shaft 42 by well known means. Two or more sets of filter cylinders 58 may be assembled end to end using intermediate rings 94 to achieve any desired filter length.

Returning again to FIG. 1, the upper and lower end walls 52, 54, filter cylinders 58 and the peripheral seal 66 form a plurality of inlet annular chambers 67a, 67b and 67c which are open at the bottom to the incoming gas to be cleaned but are closed at the top; and a set of outlet annular chambers 69a and 69b which are open at the top to the gas outlet 40 but are closed at the bottom. Thus, the end walls 52, 54, filter cylinders 58 and the peripheral seal 66 form a barrier through which the gas must flow in passage between the inlet and the outlet. The filter cylinders 58, being made of gas-permeable material such as kaowool, allow the passage of gas through their walls from the inlet annular chambers 67 to the outlet annular chambers 69 while filtering out dust and other particulates from the gas stream.

Means for rotating the rotating shaft 42 are provided. Although other means for rotation, such as manual crank, electric motor and gears, cams and levers may be used, it has been found convenient to use the reciprocating motion of a pneumatic cylinder 68 to provide the force for rotation. A brace 70 is rigidly connected to the lid 34. One end of the pneumatic cylinder 68 is connected to the brace 70. The push-pull rod 72 of the pneumatic cylinder 68 is hingedly connected by well known means, such as clevis 74 and pin 76 to a crank arm 78. The crank arm 78 is rigidly connected to the rotating shaft 42. Air pressure, from a well known source (not shown), is admitted to the pneumatic cylinder through the fitting 80. The air pressure behind the piston 82 urges the piston and push-pull rod 72 forward. The force imparted to the crank arm 78 causes the rotating shaft 42 and the attached end walls 52, 54 and filter cylinders 58 to rotate. A second fitting (not shown) may be provided to drive the piston 82 in the opposite direction or it may be returned to its original position by suction, a spring, or the like.

Cleaning means such as scrapers, brushes, vibrators or, preferably, gas jets may be stationarily located in the inlet annular chambers 67a, 67b, 67c and/or in the outlet annular chambers 69a, 69b. When the rotating shaft 42 and the filter cylinders 58 are rotated, the surfaces of the filter cylinders 58 are moved past the stationary cleaning means, thereby cleaning the entire surface. In the embodiment herein described, four sets of cleaning means spaced approximately 90 degrees apart are required for full coverage. An oscillatory motion of 90 degrees is sufficient to reach all parts of the filter cylinders 58. If other patterns of upper and lower braces 60, 62 and/or more or less cleaning means are used, larger or smaller angular excursions may be used. For example, if only a single brace 60, 62 extending completely across the top and bottom of the rotating assembly is used, two sets of cleaning means and a rotation of 180 degrees is sufficient for full coverage.

Since the contaminants are stopped at the inlet sides of the filter cylinders 58, the cleaning means must be arranged to dislodge them from that location. Thus, if mechanical cleaning means, such as brushes or scrapers are used, they are preferably arranged in the inlet annular chambers 67a, 67b, 67c to bear on all adjacent inlet surfaces of the filter cylinders 58.

In the preferred embodiment, gas jets are used and they are preferably arranged in the outlet annular chambers 69a and 69b. In FIG. 1, a flush-gas inlet line 84 is shown feeding an outlet-side manifold 86. The outlet-side manifold 86 feeds a plurality of pipes 88 which extend downward into the outlet annular chambers 69. Side jets or perforations (not shown) in the sides of the pipes 88 direct the flush gas toward the filter cylinders. The blast of flush gas passes through the walls of the filter cylinders 58 and dislodges the contaminants from their inlet side.

Gas-jet cleaning located in the outlet annular chambers 69 may be combined with brushes or scraper devices in the inlet annular chambers 67 to both mechanically and pneumatically dislodge the contaminants from the inlet side of the filter cylinders 58.

Additional benefit may be gained from having gas-jet cleaning at the inlet as well as the outlet side of the filter cylinders 58. Accordingly, FIG. 1 also shows an inlet side manifold 90 feeding flush gas to an additional set of pipes 92 in the inlet annular chambers 67.

The type of flush gas used will depend on the operating conditions and the type of contaminants to be dislodged. If the gas jets must be used while the filters are at elevated temperatures, an inert gas such as carbon dioxide should be used to prevent chemical reaction. At low temperatures in some applications, air may be used as a flush gas.

Cleaning of the filters is performed intermittently. The gas source is shut down, the rotary cleaning motion performed one or more times, the contaminants fall from the filter cylinders and are removed in conventional manner as by conveyor belts, hoppers or the like (not shown).

After a period of use, the filters may become clogged with contaminants beyond the ability of the above cleaning devices to clean them. The gas purification device 10 is configured to allow convenient and rapid removal and replacement of the filter cylinders. The entire filter assembly consisting of the lid 34, cylinder 26 and the rotating parts connected to them can be conveniently lifted from the housing 12; the outward-directed flange 28 passing through the opening 24. Once clear of the housing 12, the filter cylinders 58 may be cleaned, repaired or replaced and the assembly can then be readily replaced in the housing 12. Alternatively, a new filter assembly can be substituted for the one removed.

It will be understood that the claims are intended to cover all changes and modifications of the preferred embodiments of the invention, herein chosen for the purpose of illustration which do not constitute departures from the spirit and scope of the invention. For example, instead of the filter tubes being made rotatable, they may be made stationary and the cleaning means can be rotated. Thus it is not essential for cleaning that the filter tubes be rotated but only that the filter tubes and cleaning means be rotated with respect to each other.

What is claimed is:

1. A filter apparatus for continuous filtering of gasses containing particulate matter comprising:
   (a) a housing;
   (b) a cylindrical filter assembly within said housing;
   (c) inlet means in said housing for admitting gas to said filter assembly;
   (d) outlet means in said housing for exiting gas from said filter assembly;
   (e) said filter assembly including a plurality of permeable self-supporting filter cylinders within said filter assembly;
   (f) said filter cylinders having substantially different diameters and substantially equal lengths;
   (g) said filter cylinders being nested coaxially creating annular chambers therebetween;
   (h) means for blocking the entry of gas into alternate chambers;
   (i) means for blocking the exit of gas from the other said annular chambers;
   (j) seal means for blocking the passage of gas from inlet means to outlet means through the innermost of said filter cylinders;
   (k) seal means for blocking the passage of gas from inlet means to outlet means past the outside of the outermost of said filter cylinders;
   (l) a plurality of spaced cleaning devices stationarily located about the axis of said filter cylinders;
   (m) said housing comprising a stationary portion having an open top portion and removeable lid means for covering said open top;
   (n) a seal joining said stationary portion and said removeable lid means;
   (o) means for suspending said filter assembly from said removeable lid means;
   (p) means for rotating said filter cylinders through at least the angular separation between adjacent cleaning devices; and
   (q) said lid means and filter assembly being removeable as a unit from said stationary portion.

2. The filter apparatus of claim 1 wherein the filter material of said filter cylinders are aluminum-silicon-oxide.

3. The filter apparatus of claim 1 wherein said means for rotating said filter cylinders comprises:
   (a) a rotatable shaft substantially coaxial with said filter cylinders; and
   (b) means for connecting said filter cylinders to said rotatable shaft.

4. The filter apparatus of claim 3 further comprising:
   (a) said rotatable shaft passing through said lid means; and
   (b) means for sealing said rotatable shaft in said lid means whereby the escape of gas is substantially prevented.

5. The filter apparatus of claim 1 wherein said seal comprises:
   (a) a water channel containing water; and
   (b) a downwardly extending peripheral flange on said top extending into said water.

6. The filter apparatus of claim 1 wherein each of said filter cylinders is made up of at least two filter tubes having substantially the same diameter and being joined end to end.

7. The apparatus recited in claim 1 wherein said plurality of filter cylinders comprises 4 filter cylinders coaxially nested.

8. The apparatus recited in claim 1 wherein said filter cylinders are constructed of materials which will withstand temperatures of at least about 800° C.

9. The apparatus recited in claim 8 wherein said filter cylinders are constructed of materials which will withstand temperatures of at least about 1000° C.

10. The apparatus recited in claim 1 wherein said plurality of spaced cleaning devices comprise pressurized flush gas jets in the annular chambers to which entry of gas directly from said inlet is blocked, said gas jets being directed at the surfaces of said filter cylinders.

11. The filter apparatus of claim 10 further comprising at least four pressurized flush gas cleaning devices stationarily located at 90 degrees from each other about the axis of said filter cylinders in the annular chambers from which the direct exit of gas to the outlet is blocked, said pressurized flush gas cleaning devices having gas jets directed at the surfaces of said filter cylinders.

* * * * *